United States Patent [19]

Angell et al.

[11] Patent Number: 5,484,670
[45] Date of Patent: Jan. 16, 1996

[54] LITHIUM ION CONDUCTING IONIC ELECTROLYTES

[75] Inventors: C. Austen Angell, Mesa; Kang Xu, Tempe, both of Ariz.; Changle Liu, Tulsa, Okla.

[73] Assignee: Arizona Board of Regents, a body corporate of the state of Arizona, acting for Arizona State University, Tempe, Ariz.

[21] Appl. No.: 262,158

[22] Filed: Jun. 20, 1994

Related U.S. Application Data

[63] Continuation-in-part of Ser. No. 901,669, Jun. 22, 1992.
[51] Int. Cl.[6] .............................. H01M 6/14; H01M 6/18
[52] U.S. Cl. ......................... 429/199; 429/188; 429/192
[58] Field of Search .................................. 429/199, 191, 429/207, 192, 190, 188

[56] References Cited

U.S. PATENT DOCUMENTS 3,445,290  5/1969  Elliott et al. .
3,615,828  10/1971  Fischer .
4,234,667  11/1980  Bennion et al. .

Primary Examiner—John S. Maples

[57] ABSTRACT

A liquid, predominantly lithium-conducting, ionic electrolyte is described which has exceptionally high conductivity at temperatures of 100° C. or lower, including room temperature. It comprises molten lithium salts or salt mixtures in which a small amount of an anionic polymer lithium salt is dissolved to stabilize the liquid against recrystallization. Further, a liquid ionic electrolyte which has been rubberized by addition of an extra proportion of anionic polymer, and which has good chemical and electrochemical stability, is described. This presents an attractive alternative to conventional salt-in-polymer electrolytes which are not cationic conductors.

11 Claims, 4 Drawing Sheets

○ PVSLi
▽ 0.75 mol% PVSLi in 92.5 mol% LiClO4/LiNO3

○ 7.5 mol% PVSLi in 92.5 mol% LiClO4/LiNO3 at R.T.

▼PEGdiSLi
▽0.58LiClO$_4$-0.36LiNO$_3$-0.06PEGdiSLi

LITHIUM ION CONDUCTING IONIC ELECTROLYTES

This invention was made with the assistance of United States Department of Energy (DOE) grant number DE-FG02-89ER4535398. The United States Government may have certain rights in this invention. This application is a continuation-in-part of prior U.S. patent application Ser. No. 07/901,669 filed Jun. 22, 1992 entitled "Lithium Ion Conducting Electrolytes" still pending.

INTRODUCTION

The present invention relates generally to lithium ion high conducting, non-crystalline "polymer-in-salt" electrolytes and derivatives thereof, and more particularly to a novel and unique class of this type of electrolyte in which the polymer is an anionic polymer and which electrolytes are especially well suited for use with high current-density requiring systems such as primary and secondary batteries, as well as photochromic devices, and solar cells.

BACKGROUND OF THE INVENTION

In the search for suitable materials from which to construct high energy density solid state batteries, one of the principal obstacles has been the provision of a suitable electrolyte. A variety of approaches have been tried heretofore. The one which received the most attention among those prior approaches is the one based on polymer solvents in which an optimized amount of ionic salt is dissolved in the polymer solvent (See Armand et al., U.S. Pat. No. 4,303,748; Andre et al., U.S. Pat. No. 4,357,401; and Kronfli et al., U.S. Pat. No. 5,009,970). Other approaches, which possessed both specific advantages and disadvantages, involved glassy solid electrolytes, and certain plastic crystal or disordered crystal electrolytes. None of these approaches, nor, indeed, any of the prior art approaches, obtain all the properties generally recognized as prerequisites to the successful development of a high power solid state battery, namely, (1) high ionic conductivity (about $10^{-3}$ $\Omega^{-1}$ cm$^{-1}$ or above); (2) conductivity by lithium cations (to avoid undesirable cell polarization problems); (3) a rubbery consistency (to permit the deformation of the electrolyte as needed to accommodate volume changes during charging and discharging cycles); (4) a wide electrochemical window (to permit the utilization of anode/cathode combinations which provide high voltages); and (5) good adherence to the electrode surfaces (to prevent mechanical/electrical problems that could otherwise develop during charging and discharging cycles).

Each substance heretofore developed for solid electrolyte purposes possesses only a limited number of the above-identified desiderata. None achieved them all. For instance, the so-called superionic glass electrolyte, exemplified in the most successful case by $Li_2S$—$LiI$—$Y$ (where Y is a Lewis acid such as $P_2S_5$, $B_2S_3$, $SiS_2$), achieves some of the above listed properties namely, 1,2,4 and 5 but is quite brittle and totally lacks the desired rubbery consistency. Examples of this type of electrolyte are described by Malugani et al. in U.S. Pat. No. 4,331,750 and by Akridge in U.S. Pat. No. 4,585,714.

The prior art salt-in-polymer approach mentioned above, satisfies three of the desiderata namely, 3,4 and 5, but fails miserably with regard to properties 1 and 2. For instance, neither of two recent U.S. Patents dealing with salt-in-polymer electrolytes reported a room temperature conductivity greater than $1 \times 10^{-5}$ $\Omega^{-1}$ cm$^{-1}$ for solvent-free or plasticizer-free systems (See: Kronfli et al., U.S. Pat. No. 5,009,970; Knight et al. U.S. Pat. No. 4,737,422). One prior art effort to rectify the poor conductivity of the salt-in-polymer electrolyte involved the addition of low molecular weight plasticizers to the mixture (See: Koksbang et al. *J. Power Sources* 32, 175, (1990)). However, improved conductivity was achieved at the expense of introducing unwanted volatile components into the electrolyte making the electrolyte subject to explosion if overheated, and leading to unwanted reactions between plasticizer and lithium anode. Since the solubility of lithium salts in the polymer electrolytes is predicated upon attraction between the lithium cations and the solvating groups in the polymer, these electrolytes further suffer from the fact that the lithium is the less mobile cation. This means that the cation conductivity desideratum, identified as "2" above, is never achieved except in the poorly conducting, single mobile ion polymers which are described by Noda et al. in U.S. Pat. No. 4,844,995. It is believed that it is fundamentally unlikely that this problem can be rectified in the usual polymer/Li salt type of medium. Claims have been made that the problem can be somewhat reduced by using plasticized polymers although no verification of these claims has been found. Exemplary polymer-in-salt type electrolytes are disclosed in U.S. Pat. Nos. 4,303,748; 4,357,401; 4,585,714; and 5,009,970.

A major improvement, which overcomes the deficiencies of the aforementioned polymer/Li systems, is disclosed by Angell and Liu, U.S. patent application Ser. No. 07/901,669 filed Jun. 22, 1992. Disclosed therein is a novel and unique high-conductivity lithium-containing electrolyte comprising a viscous liquid or rubbery solid comprised mainly of lithium salts which obtain conductivity by the decoupled motion of the lithium ions which remain freely mobile even in a glassy state and at temperatures below $-20°$ C.

While the Angell/Liu electrolyte solves the aforementioned disadvantages to some degree, a continuing desiderata in the art of battery construction is the generation of higher conducting electrolytes with still better thermal, chemical, and electrochemical stabilities.

As is apparent, a great need exists for the development of an improved electrolyte which obtains all of the desiderata listed above without the acquisition of unacceptable deleterious properties. It is toward this goal that the present invention is directed. A preferred embodiment of the present invention obtains all of the desiderata listed above and yields conductivities on the order of $10^{-4}$ $\Omega^{-1}$ cm$^{-1}$. The electrolyte of the present invention obtains an even greater conductivity advantage at temperatures above room temperature. Further, in certain composition realizations, the present invention provides a predominantly $Li^+$-conducting (i.e. cation decoupled) viscous liquid electrolyte suitable for use in porous polymer or conventional paste electrolytes, to obtain a conductivity which may reach $10^{-3}$ $\Omega^{-1}$ cm$^{-1}$. These conductivities, which are due to decoupled $Li^+$ mobility as shown elsewhere (Angell et al., Nature, 362, 137–139, (Mar. 11, 1993)), are comparable with, or better than, those of any previously described ambient temperature molten salt electrolytes containing Li salts, such as those described by Cooper and Angell, Solid State Ionics, 9 & 10, 617, (1983) or by Takami et al., (Chem Abs 118: 195131d, Jpn. Kokai Tokkyo Koho JP 04,349,365 [92,349,365] Cl. HOlM10/40.03 Dec. 1992. Appl. 91/120,836. 27 May 1991: 4 pp). Neither of the latter electrolytes fall within the scope of the present application because they owe their high room temperature conductivities to the lowering of $T_g$ obtained by the inclusion of considerable mole fractions of non-lithium salts, namely, organic salts (Tetraalkyl ammonium or otherwise-substituted ammonium salts). As our earlier work cited above shows, inclusion of such organic salts destroys the decoupling of the Li$^+$ ion motion hence leads to undesirably low Li$^+$ transport numbers.

BRIEF SUMMARY OF THE INVENTION

The present invention relates to a novel high-conducting lithium-containing electrolyte comprising viscous liquid or rubbery solid mixture of lithium salts which obtain conductivity by the decoupled motion of the lithium ions which, when produced in accordance herewith, remain highly mobile, even in a glassy state at and below $-20°$ C. In a preferred practice, a liquid lithium salt or salt mixture, which may be supercooled at room temperature, is combined with a small mole fraction (circa 20 percent of polymer repeat unit) of a high molecular weight anionic polymer (or a functionally equivalent high molecular weight soluble polymer) which provides the basis for a rubbery consistency and which further protects the solution against crystallization of the salts.

The remarkable advantage of the electrolyte of the present invention is believed attributable to the elimination of the molecular polymer used by Angell and Liu, ibid, which did not contribute any conducting particles to the electrolyte, and replacing it with an ionic polymer which contributes Li$^+$ ions to the mixture and does not chelate (tie down, trap) any of the Li$^+$ cations already present as did the molecular polymer. Hence the present electrolyte is in principle a superior rubberizing agent and electrolyte additive, and an improved electrolyte. The preferred solid electrolyte of the present invention obtains a previously unheard of combination of properties, namely, (a) conductivity in the order of $10^{-3}$ $\Omega^{-1}$ cm$^{-1}$ at room temperature in the absence of polymer and exceeds $10^{-4.5}$ $\Omega^{-1}$ cm$^{-1}$ at room temperature when modified as herein described by the dissolution of polymer into the salt; (b) conduction by lithium cations in a manner which avoids or minimizes the polarization problems heretofore endemic to the common lithium salts-in-polymer electrolyte solution systems; (c) a rubbery consistency which readily absorbs stress on the electrolyte; (d) good adhesion to metal electrodes; and (e) a wide electrochemical window and stability in the presence of Li metal or Li/C intercalates. While one or more of the foregoing properties has been heretofore obtainable in some of the known electrolytes, no electrolyte except those electrolytes disclosed in the co-pending application by Angell et al., cited above, have ever been developed which obtained all of these properties in a single system.

While superionic glass electrolytes have been heretofore known to obtain various important properties such as high conductivity and, Li$^+$conduction hence reduction and/or elimination of polarization, this so-called superionic glass electrolyte is brittle. Furthermore, the rubbery polymer salt alternatives, which have sufficient resiliency to absorb mechanical stresses, suffer from being predominantly anion conductors and requiring plasticizer additions to obtain high conductivity. None of the known electrolytes achieves the unique combination of properties, so long desired but heretofore unobtainable, that is achieved by the present invention as is hereinafter described in detail.

Accordingly, an object of the present invention is to provide a new and improved type of lithium-conducting electrolyte which has improved stability against crystallization at ambient temperature and which obtains unexpectedly high conductivity at ambient temperature and at 100° C. while being resistant to reduction by lithium metal.

Another object is to provide new and improved predominantly Li$^+$-conducting viscous liquid electrolyte which obtains conductivity of about $10^{-3}$ $\Omega^{-1}$ cm$^{-1}$ at room temperature and almost $10^{-1}$ $\Omega^{-1}$ cm$^{-1}$ at 100° C.

Still another, and indeed the principal, object of the present invention is to provide a new and improved lithium ion conducting electrolyte containing molten lithium salts and having sufficient long-chain high molecular weight anionic polymer dissolved therein to provide a rubbery, non-brittle consistency to the electrolyte with a 25° C. conductivity exceeding by one order of magnitude any claimed in the co-pending application.

These and still further objects as shall hereinafter appear are readily fulfilled by the present invention in a remarkably unexpected manner as will be readily discerned from the following detailed description of preferred embodiment when read in conjunction with the accompanying drawing.

DESCRIPTION OF PREFERRED EMBODIMENTS

Figure 1:
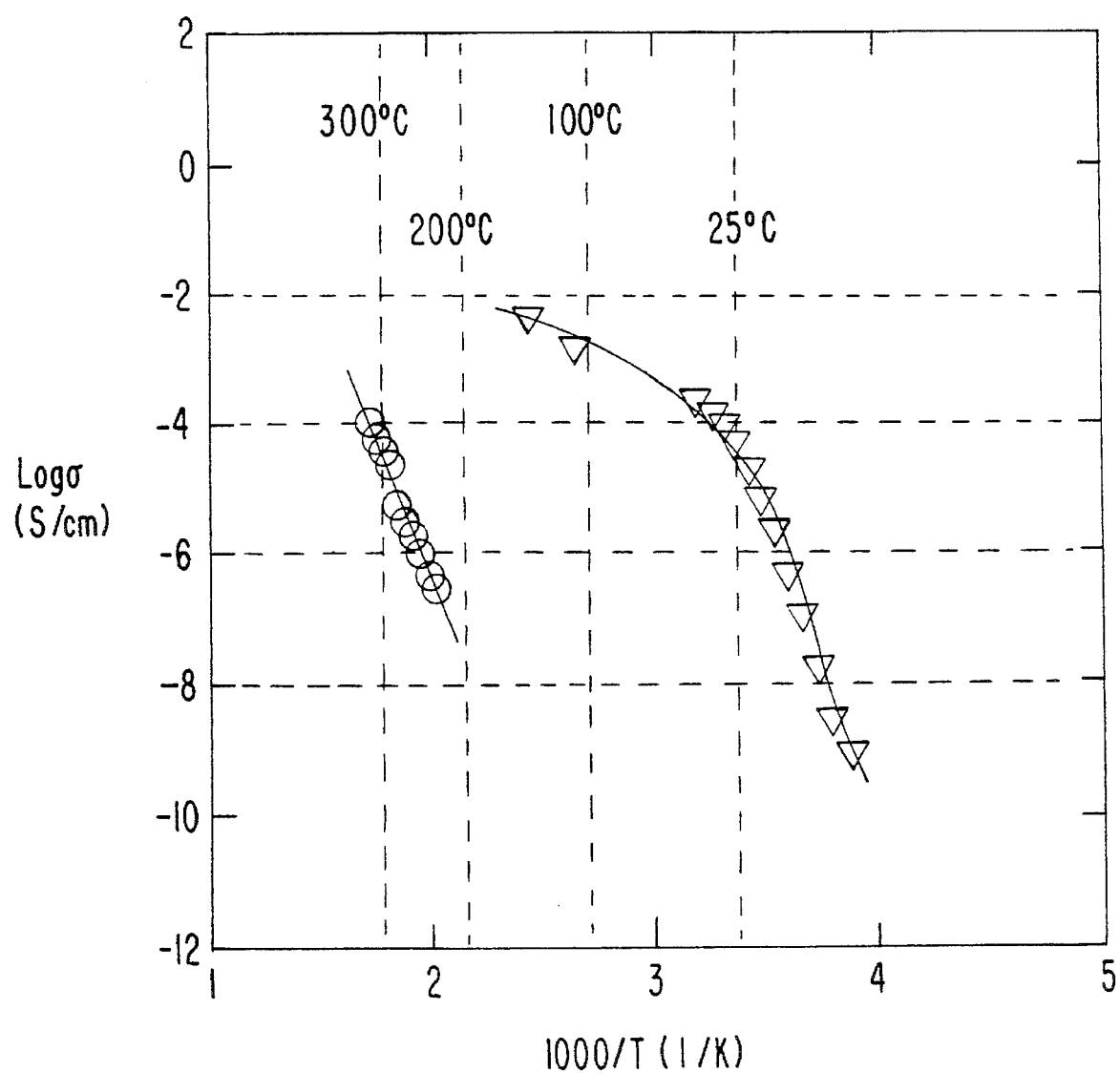
FIG. 1 is a diagram showing DC conductivity versus reciprocal absolute temperature for two related embodiments of the present invention and a comparison with prior art.

The high ionically conducting solid electrolyte of the present invention is based upon the creation of a system of the superionic glass-type of predominately Li$^+$ ion conducting electrolyte in which, by suitable choice of components, the glass transition temperature can be pushed far below room temperature. Then one is able to produce the dimensional stabilization of the viscous liquid lithium-conducting electrolyte by the dissolution of a relatively small amount of a long-chain (high molecular weight) anionic polymer which, by the normal chain entanglement phenomenon or by light crosslinking, bestows a rubbery consistency to the ionic liquid. Thus, the aim of providing a predominantly Li$^+$-conducting electrolyte having exceptionally high conductivity at ambient temperature (measured as high as $10^{-2}$ $\Omega^{-1}$ cm$^{-1}$ at 25° C.) and capable of being obtained in a rubbery state is achieved and all of the five desiderata enumerated as goals for a new and valuable electrolyte are satisfied.

An essential and distinct feature of the new rubbery material of this invention is the high content of lithium salts relative to polymer. The preferred embodiment contains not less than 70 percent lithium salts, and not more than 30 percent polymer (based on mol percent of polymer repeat units). The high lithium content is desirable to maximize the dominance of lithium ion conduction in the material.

The salts used in preparing the electrolyte of the present invention were mostly reagent grade chemicals obtained from companies such as ALPHA, ALDRICH, and like major suppliers. They were all used without further purification, except for removal of any water present in the as received material. Where available, anhydrous salts were used. Among the suitable lithium salts which were useful in the practice of the present invention are the thiocyanate, iodide, bromide, chloride, nitrate, perchlorate, acetate, tetrafluoroborate, haloaluminate, and halothioaluminates and were prepared in house from available reagents (lithium salts and aluminum halides), chlorosulfonate, trifluoromethane sulfonate, trichloromethane sulfonate, 1-fluoro-1-chloro-2,2-difluoro-2 chloroethane sulfonate, and perfluoromethane sulfonamide (Li "imide" available from 3M Company). In cases such as LiSCN, the partially hydrated salts were dried under vacuum at temperatures in the vicinity of 150° C. Great care was needed in the case of LiSCN to avoid decomposition when the water content approached zero.

The novel ingredients, the particular anionic polymers, were poly lithium vinyl sulfonate hereinafter called PVSLi, and two low molecular weight polymer salts, (1) polyethylene glycol disulfonate lithium and (2) polyethylene glycol monomethyl ether sulfonate lithium, hereafter called PEGdiSLi and PEGmonoSLi. PVSLi was synthesized in this laboratory by dissolving vinyl sulfonate lithium (synthesized in a similar manner to that of the corresponding sodium salt as described by (a) G. C. H. Stone, J. Am. Chem. Soc. 1936, 58, 488 (b) U.S. Pat No. 3,022,172 (Feb. 20, 1962)) in water and polymerizing with a radical initiator as follows: an aqueous solution of 10 gram of monomer vinylsulfonate lithium (VSLi) and 1 mol% of initiator $K_2S_2O_8$ in ca. 100 mL water was degassed and flashed with nitrogen repeatedly. Then it was sealed under nitrogen atmosphere and polymerization was carried on at 60~70° C. for hours until viscous precipitation occurred. The resultant polymer poly(vinyl sulfonate) (designated as PVSLi) was then repeatedly dissolved with water and precipitated with methanol for a few times to get the high molecular fraction, which was dried under vacuum to yield the material for conducting glass-making. The yield based on monomer used was ca. 40%.

The molecular weight determined by intrinsic viscosity measurements was ~300,000 ($3.0 \times 10^5$). To create the electrolyte, dry salts were added, and the mixture melted and held in a vacuum oven at 120° C. and <0.5 torr for several days to remove all traces of water.

PEGdiSLi was prepared as follows: 44.45 gram (0.22 mole) of poly(ethylene glycol) (average molecular weight 200) (PEG200) and 39.55 gram (0.50 mole) of pyridine in dry $CHCl_3$ was added dropwise to 60.34 gram (0.50 mole) of $SOCl_2$ at 0°~5° C. under violent stirring. After addition completed the reaction mixture was refluxed for 3 hours and cooled to room temperature. Water was carefully added and then organic phase was separated and washed with water to neutral. After filtered and dried over anhydrous $CaCl_2$, evaporation of solvent was followed by vacuum distillation under reduced pressure, which yielded 38.33 gram (0.16 mole) of 1,ω-dichloroethylene glycol.

32.59 gram (0.137 mole) of the above dichloride was added dropwise to 300 mL boiling aqueous solution of 44.43 gram (0.35 mole) of $Na_2SO_3$. The reaction mixture was refluxed for 24 hours until no phase separation was visible. Water was then evaporated to dryness and the residual white solid was extracted with MeOH. Evaporation of MeOH gave 45.00 gram (0.121 mole) sodium sulfonate (PEGdiSNa). 20.00 gram (0.054 mole) of PEGdiSNA was dissolved in 150 mL water and acidified by passing through an H+ exchange resin column, and the resultant acidic solution was neutralized with excess amount $LiCO_3$. After being evaporated to dryness, MeOH-extraction was done which gave 18.34 gram (0.052 mole) lithium sulfonate (PEGdiSLi, average M.W. 340) as a light-brown glassy material. PEGmonoSLi (average M.W. 489) was synthesized essentially as described for PEGdiSLi.

Impedances and capacitances of the glass and supercooled liquids prepared in the present invention were determined using a simple twin platinum electrodes dip-type cells with cell constant of about 0.2. Ionic conductivities were determined automatically using a HEWLETT-PACKARD Model HP4192A-Frequency Analyzer. The initial study was conducted using an all-metal two electrode cell of cell constant about 0.02 $cm^{-1}$ which had been used extensively in previous research for measurements of conductivity in the range from $10^{-8}$ to $10^{-3}$ $\Omega^{-1}$ $cm^{-1}$. Measurements were automated to cover a predetermined temperature range at a sequence of temperatures controlled to ±0.1° C. by a EUROTHERM temperature controller.

The conductivities of liquid, supercooled liquid and glass states prepared in accordance with the present invention are illustrated in Examples 1 and 2. The conductivities are shown as a function of reciprocal absolute temperature in FIG. 1, and are comparable with the best results obtained from the prior art practices. The legend on each drawing identifies the example number or the essential components of the electrolyte plotted.

In one practice of the present invention to produce a room temperature Li+-conducting liquid electrolyte suitable for use in filled-porous-polymer, or paste, types of battery electrolyte, a single low melting lithium salt, such as $LiClO_3$, is mixed with a small mole fraction of PVSLi, <15 mole % repeat units, or one of the salts PEGdiSLi or PEG mono SLi, about 6 mole %, to enhance its resistance to crystallization. This simple two component system will then serve as a highly conducting room temperature liquid electrolyte in which the current is carried predominantly by the Li+ cation hence bestowing the desirable high cation transport number so notably lacking in other room temperature liquid Li salt-containing electrolytes. In this practice of the invention it is not necessary that the PVSLi be of very high MW, but only that it be high enough to render the electrolyte incapable of crystallizing.

In another practice of the invention, the resistance of the liquid electrolyte to crystallization, and the ease of remelting should crystallization occur, is enhanced by adding a second low melting lithium salt such as $LiClO_4$, or incorporating third and fourth components in suitable mole fractions such that a multicomponent eutectic or near-eutectic composition can be obtained prior to further stabilizing the melt by addition of small mole fractions of PVSLi. Small mole fractions of even higher melting salts such as LiBr may also be included to help improve the stability against crystallization via the "confusion principle".

In a further practice of the invention, a rubbery electrolyte in which the high conductivity is dominated by the Li+ cation motion is obtained by incorporating a larger mole fraction, >15 mole % repeat units, of the PVSLi of very high molecular weight, such that entanglement of the polymer chains occurs. Alternatively, a lower molecular weight PVSLi in which dilute cross linking has been introduced to bestow rubbery elasticity, may be utilized. Cross links are easily introduced by adding some divinyl lithium sulfonate to the polymerizing solution, or by other standard methods. A single lithium salt of low melting character such as $LiClO_3$ may be used. However, in a preferred practice, a binary or multicomponent mixture of low melting lithium salts is used to maximize the resistance to crystallization or even render the melt thermodynamically stable under conditions of application. Under conditions of elevated temperature application, many of these newly invented rubbery solid $Li^+$-conducting electrolytes will be thermodynamically stable, and this may be their preferred domain of application since their conductivities may then be extremely high and greater even than those of aqueous solutions of lithium salts.

To further aid in the understanding of the present invention and not by way of limitation, the following examples are presented.

EXAMPLE 1

To obtain a liquid electrolyte which is $Li^+$-conducting but which contains only a single lithium salt, in combination with the anionic polymer, 1.092 g of $LiClO_3$ were combined with 0.164 g of PVSLi to produce a melt of conductivity $10^{-4.5}$ S cm$^{-1}$ at room temperature and $10^{-1.7}$ S cm$^{-1}$ at 100° C.

EXAMPLE 2

To improve the stability against crystallization of an electrolyte like that in Example 1, $LiClO_3$ (0.664 g) $LiClO_4$ (0.280 g) and PVSLi (0.056 g) were admixed and heated at 120° C. under vacuum, <0.5 torr, for two days. The resultant material is a viscous liquid at room temperature which is stable against crystallization for many days. It has a $T_g$ of about 0° C. and a room temperature conductivity of $\sim 1 \times 10^{-3}$ $\Omega^{-1}$ cm$^{-1}$ at 25° C. The conductivity at the temperature of structural arrest $-3°$ C. is $10^{-6.5}$ $\Omega^{-1}$ cm$^{-1}$, which implies the highest degree of conductivity/structure decoupling yet seen in this new type of electrolyte. High decoupling implies dominance of transport by $Li^+$, hence is a good characteristic.

EXAMPLE 3

Figure 2:
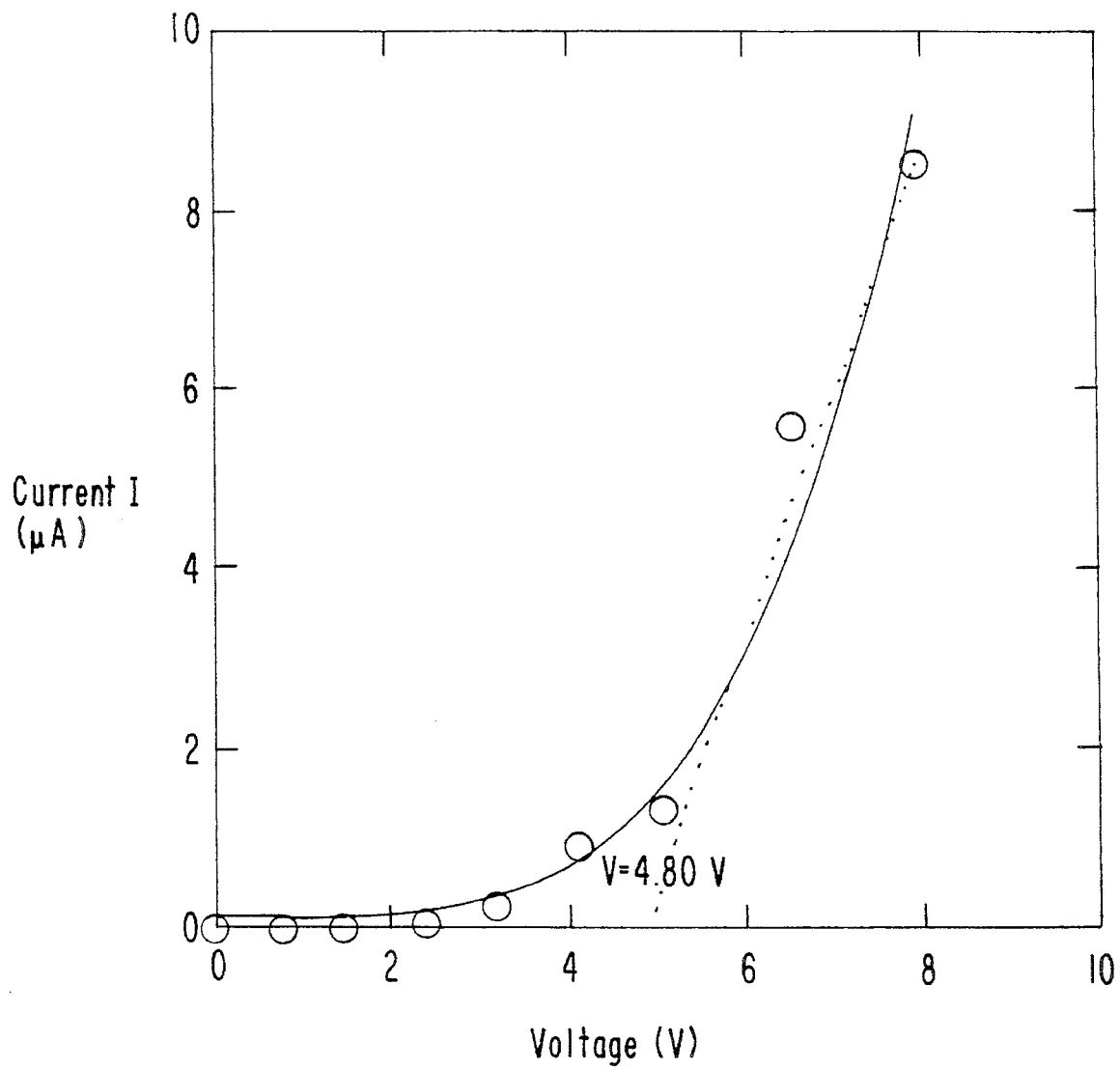
FIG. 2 is a diagram showing the relation between d.c. current in the 1–10 microampere range flowing in the electrolyte in response to d.c. voltage applied between twin platinum electrodes.
Figure 3:
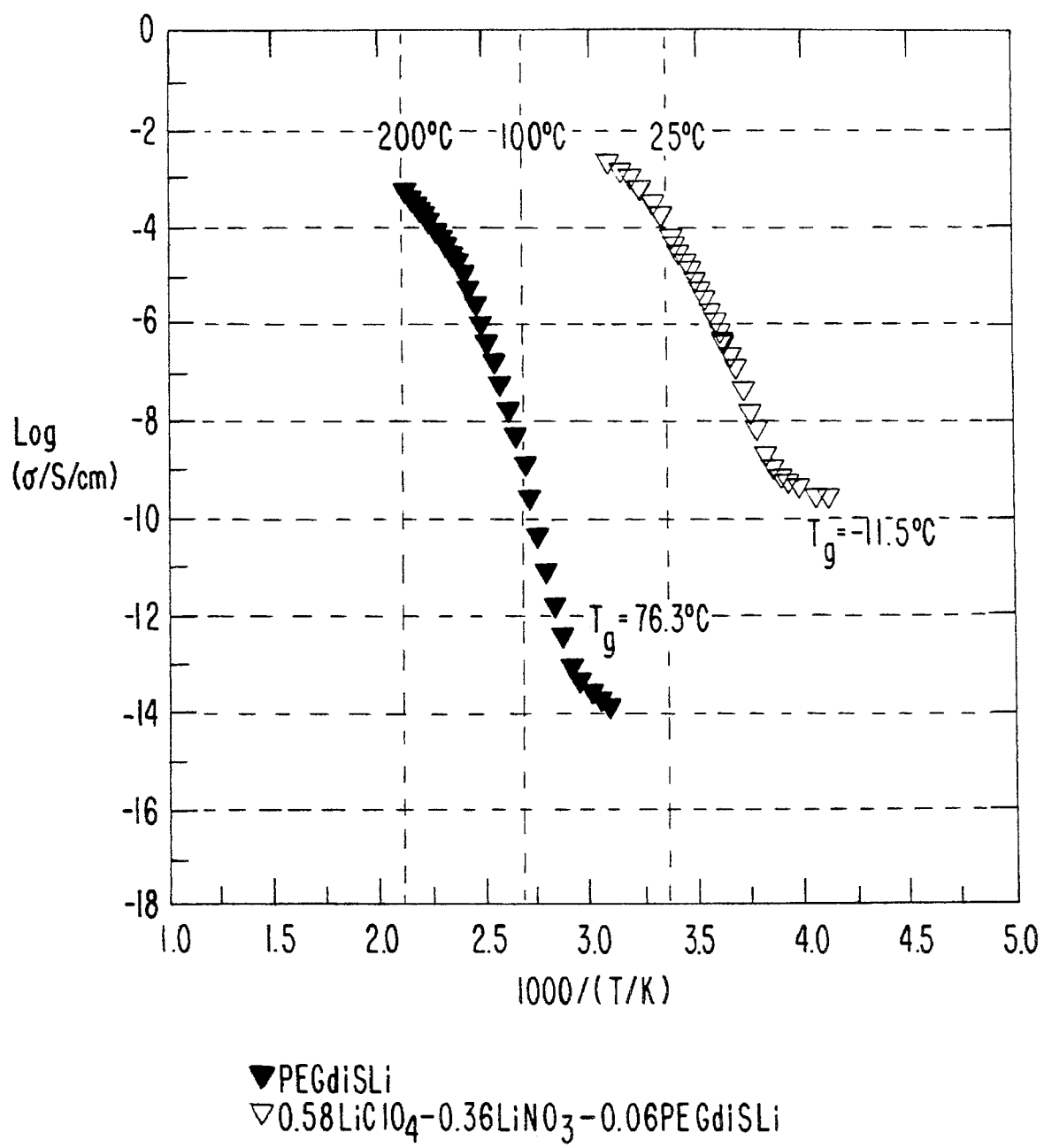
FIG. 3 is diagram showing conductivity versus reciprocal absolute temperature for the embodiment of the present invention using PEGdiSLi as the polymer added to the salt mixture 58% LiClO$_4$ plus 36% LiNO$_3$ to repress crystallization and yield room temperature conductivity of $10^{-4}$ Scm$^{-1}$.
Figure 4:
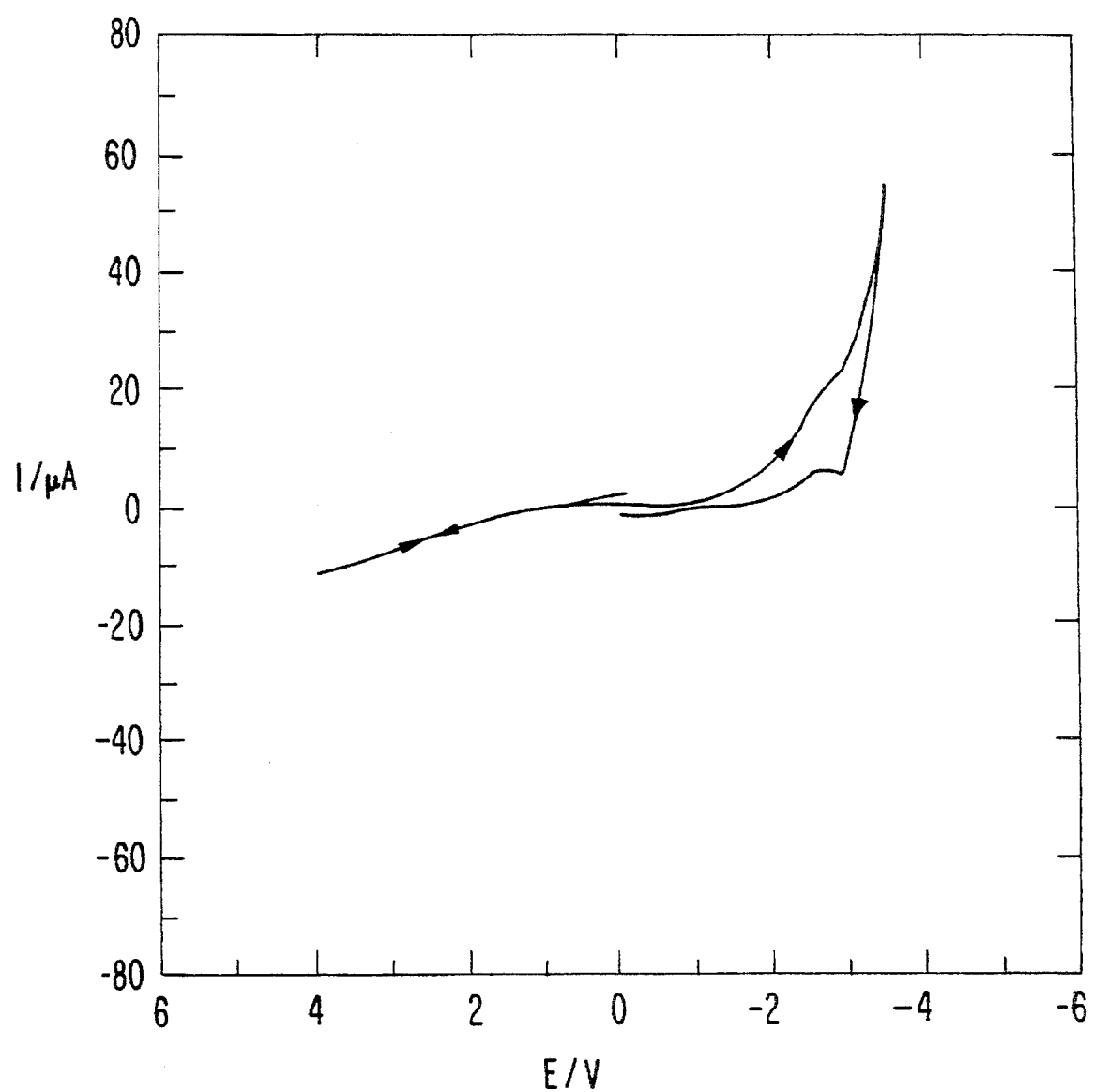
FIG. 4 is a diagram, a cyclic voltagram showing the relation between d.c. current in the microampere range flowing in the electrolyte in response to d.c. voltage applied in the way of a back and forth sweep using a three platinum electrode configuration, and indicating a 4 volt stability range.

As an example of this invention which avoids the presence of $LiClO_3$ and hence improves both the electrochemical and chemical stability, 0.080 g of PVSLi were admixed with 0.582 g of a 40:60 mol % mixture of $LiNO_3 + LiClO_4$ and melted at 220° C., to give a rubbery electrolyte of exceptional electrochemical stability. The conductivity is shown in FIG. 1 and is lower because of the additional PVSLi. The electrochemical stability, determined from a dc current vs. dc voltage curve, from measurements made using twin platinum electrodes, is demonstrated in FIG. 2 where a decomposition threshold of 4.8 V is seen. The resistance of this electrolyte to crystallization needs to be improved.

EXAMPLE 4

Accurately weighed lithium salts and PEGdiSLi were mixed and heated at 140°~160° under vacuum for a few hours. The resultant liquid was naturally cooled down to room temperature to obtain the supercooled liquid. A typical example involved 1.51 gram (0.0142 mole) $LiClO_4$, 0.61 gram (0.0084 mole) $LiNO_3$ and 0.5 gram (0.0015 mole) PEGdiSLi. The resultant molten salt $0.58LiClO_4$—$0.36LiNO_3$—$0.06PEGdiSLi$ is brown and viscous at room temperature.

From the foregoing, it is readily apparent that a useful embodiment of the present invention has been herein described and illustrated which fulfills all of the aforestated objectives in a remarkably unexpected fashion. It is of course understood that such modifications, alterations and adaptations as may readily occur to the artisan confronted with this disclosure are intended within the spirit of this disclosure which is limited only by the scope of the claims appended hereto.

Accordingly, what is claimed is:

1. A lithium ion conductive electrolyte with high conductivity comprising a solution containing a lithium salt selected from the group consisting of perchlorate, chlorate, nitrate, acetate, tetrafluoroborate, thiohalodialuminate, trifluoromethane sulfonate, haloaluminate, halodialuminate, 1-fluoro-1-chloro-2,2-difluoro-2 chloroethane sulfonate, perfluoromethane sulfonimide, or mixtures thereof and a small proportion of an anionic polymer lithium salt sufficient to stabilize said solution against crystallization, said solution being prepared by fusion or aqueous dissolution and thereafter cooled and/or dried, to yield an ionic liquid at 100° C. or lower.

2. An electrolyte according to claim 1 having a conductivity of about $10^{-1.2}$ $\Omega^{-1}$ cm$^{-1}$ at 100° C.

3. An electrolyte according to claim 1 having a conductivity of about $10^{-3}$ $\Omega^{-1}$ cm$^{-1}$ at 25° C.

4. An electrolyte according to claim 1 in which said anionic polymer is polyvinyl lithium sulfonate.

5. An electrolyte according to claim 1 in which said anionic polymer is polyethylene glycol disulfonate lithium.

6. An electrolyte according to claim 1 in which said anionic polymer is polyethylene glycol monomethyl ether sulfonate lithium.

7. An electrolyte according to claim 1 which is not reducible in the presence of lithium metal.

8. An electrolyte according to claim 1 containing sufficient anionic polymer to bestow rubbery properties to said solution but not more than 40 mol % of polymer repeat units.

9. An electrolyte according to claim 8 in which said anionic polymer is polyvinyl lithium sulfonate.

10. A lithium ion conductive electrolyte according to claim 1 in which said group of lithium salts further contains a lithium salt selected from the group consisting of thiocyanate, iodide, bromide, chloride, or mixtures thereof.

11. A lithium ion conductive electrolyte according to claim 1 in which said solution further contains a magnesium salt selected from the group consisting of perchlorate and acetate.

* * * * *